March 23, 1926.
H. L. HIRSCHLER
1,577,579
MOTION TRANSMITTING DEVICE
Filed Jan. 21, 1924  3 Sheets-Sheet 1
FIG. 1.
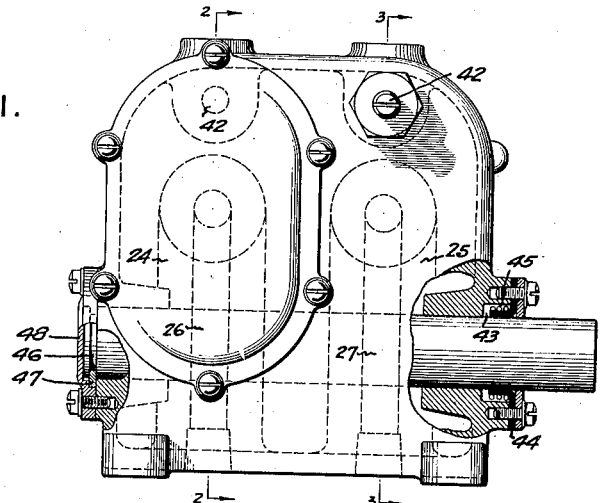
FIG. 4.
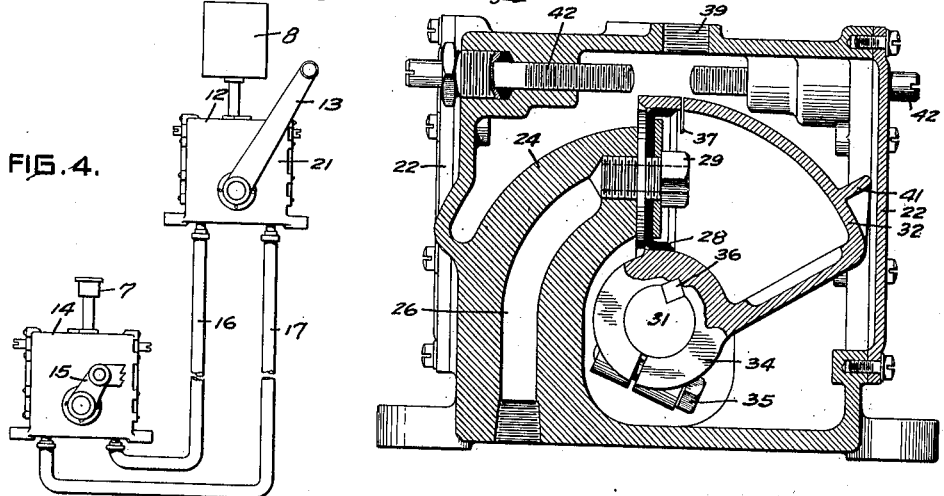
FIG. 2.
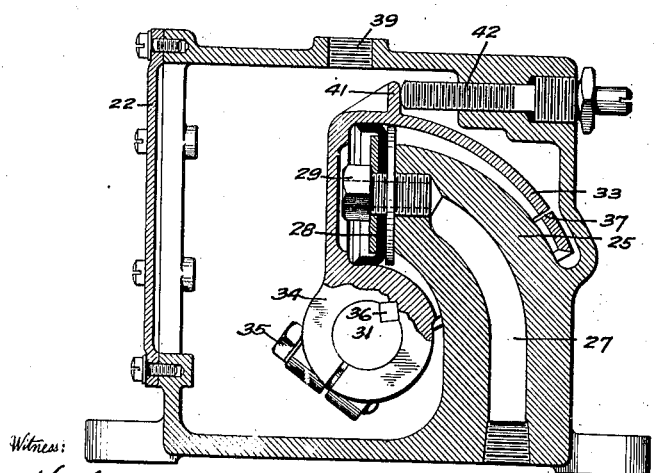
FIG. 3.
INVENTOR
Horace L. Hirschler.
BY
his ATTORNEYS.

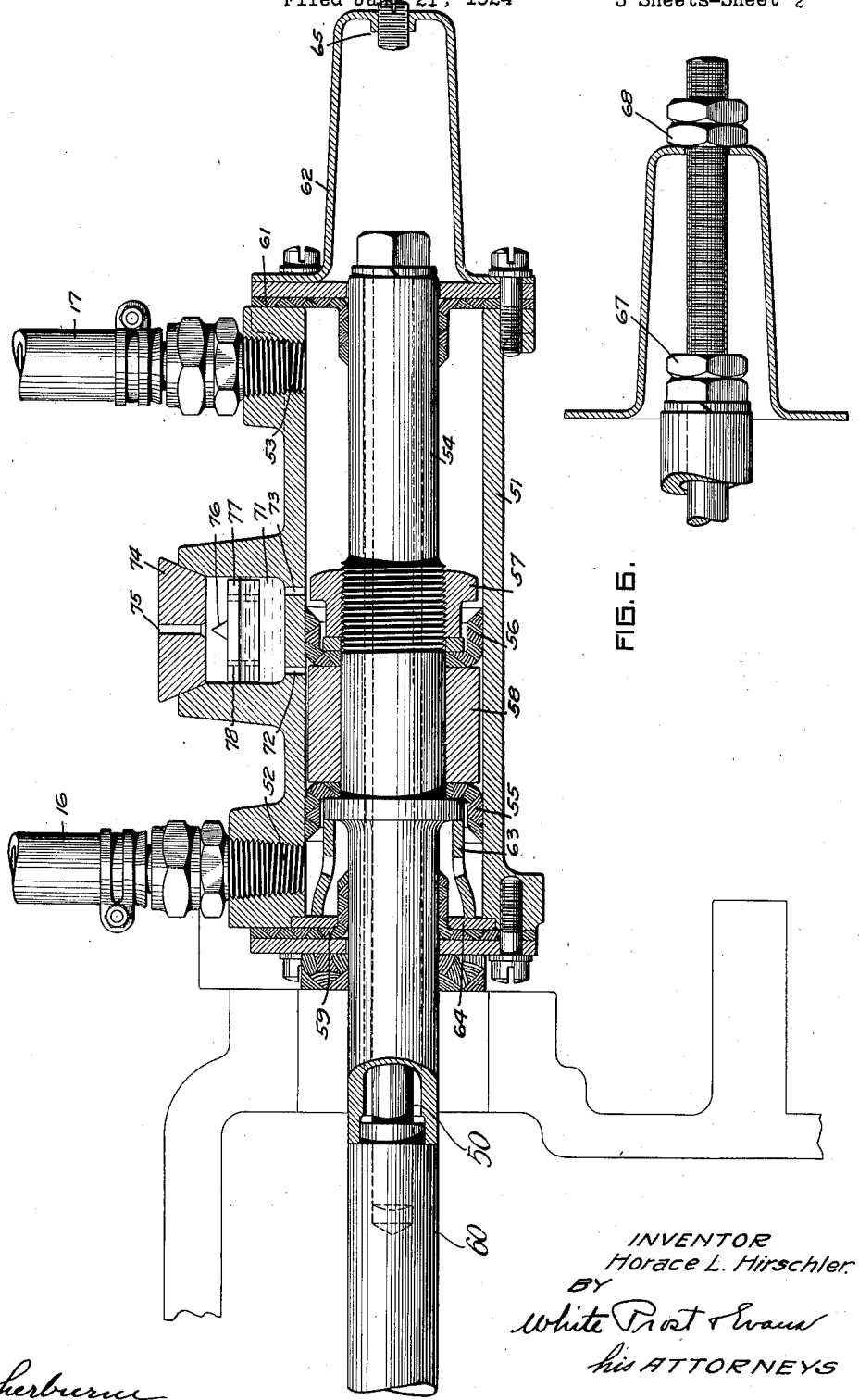

March 23, 1926.
H. L. HIRSCHLER
MOTION TRANSMITTING DEVICE
Filed Jan. 21, 1924
1,577,579
3 Sheets-Sheet 3
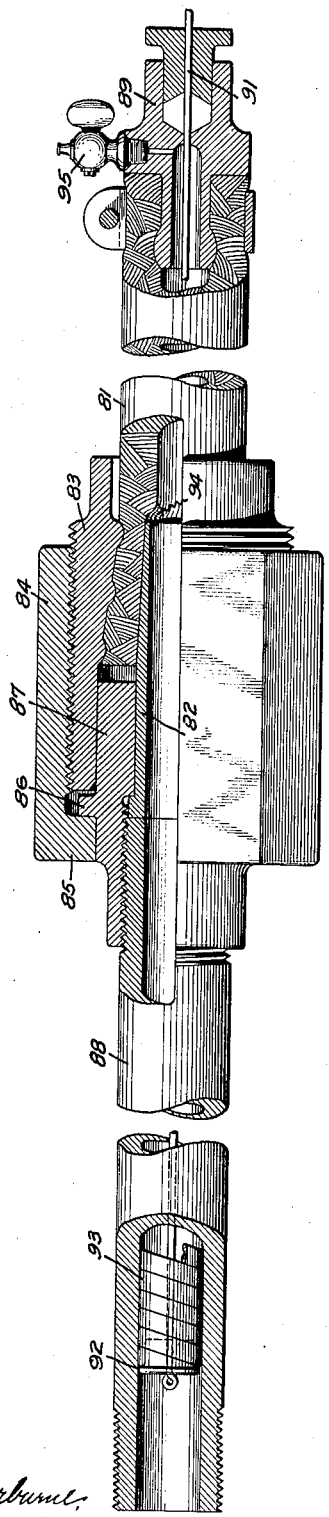
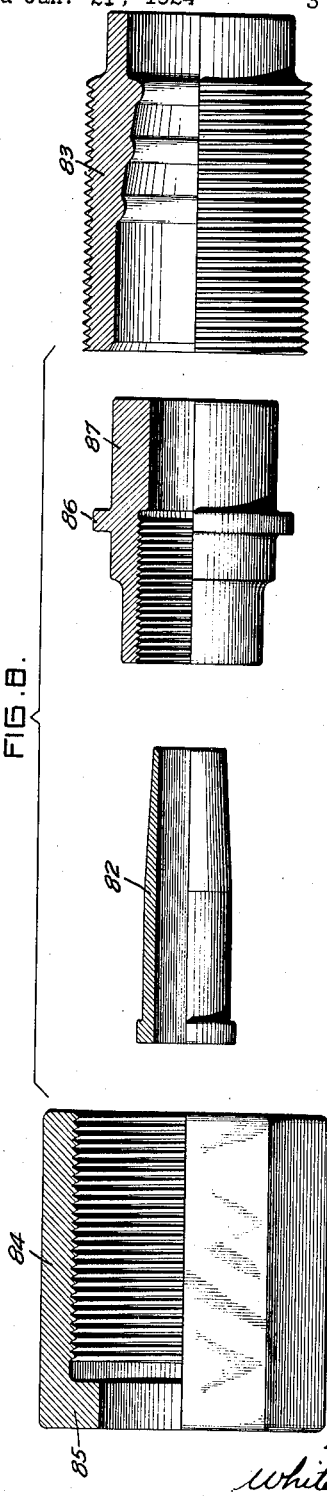
INVENTOR
Horace L. Hirschler.
BY
his ATTORNEYS.

Patented Mar. 23, 1926.

1,577,579

UNITED STATES PATENT OFFICE.

HORACE L. HIRSCHLER, OF SAN FRANCISCO, CALIFORNIA.

MOTION-TRANSMITTING DEVICE.

Application filed January 21, 1924. Serial No. 687,668.

*To all whom it may concern:*

Be it known that I, HORACE L. HIRSCHLER, a citizen of the United States, and a resident of the city and county of San Francisco, State of California, have invented a certain new and useful Motion-Transmitting Device, of which the following is a specification.

The invention relates to a device for transmitting motion thru the medium of a non-compressible fluid.

An object of the invention is to provide adjustable means for controlling the extent of operation of the device.

Another object of the invention is to provide means for varying the stroke of the device to compensate for other variable factors entering into the operation of the device.

Another object of the invention is to improve the construction of devices of this nature whereby they are more simple in manufacture and more durable and accurate in operation.

Another object of the invention is to provide means for maintaining the equilibrium between the pressure side and the return side in the transmitting column of fluid which might be disturbed by leakage, variable volume of conduit and other factors, and to provide means for varying the stroke of the device without interference with the means for establishing equilibrium.

Another object of the invention is to provide a flexible conduit of constant internal volume under varying pressures, thru which the non-compressible fluid is transmitted.

A further object of the invention is to provide a method of producing this flexible conduit of invariable internal volume.

Another object of the invention is to provide means for eliminating air which may become entrapped within the device.

The invention possesses other advantageous features, some of which, with the foregoing, will be set forth at length in the following description, where I shall outline in full, those forms of my invention, which I have selected for illustration in the drawings accompanying and forming part of the present specification. In said drawings, I have shown several forms of devices embodying my invention, but it is to be understood that I do not limit myself to said forms, since the invention, as set forth in the claims, may be embodied in a plurality of other forms.

Referring to said drawings:

Figure 1 is a side elevation of a motion transmitting device embodying my invention.

Figure 2 is a cross section of the device taken on the line 2—2 of Figure 1.

Figure 3 is a cross section of the device, taken on the line 3—3, Figure 1.

Figure 4 is an elevation of a system embodying two devices of my invention together with their connecting conduits.

Figure 5 is a longitudinal section thru a modified form of device.

Figure 6 is a section of a portion of the device shown in Figure 5, showing a modified form of means for varying the stroke of the piston.

Figure 7 is a side elevation, partly in section, of the means employed for producing a flexible conduit of invariable internal volume under varying pressures.

Figure 8 is a half-section, half-elevation, of parts of the device shown in Figure 7.

The accompanying drawings illustrate the principal parts of a motion transmitting device employing a non-compressible fluid for the transmitting medium, comprising two cylinders and pistons situated respectively, at the point or station where the actuating force or power is applied, and at the opposite or distant station where the part or mechanism to be actuated is located.

The pistons and cylinders comprising the motor at the power end or station of the apparatus, are formed as segments of a circle with the operating shaft at the center, and they are reversely arranged with respect to each other and also to the corresponding cylinders and pistons of the motor at the opposite station. The pistons are fixed or stationary, and the cylinders are the moving parts; those in each motor being fixed or connected to a common shaft, so as to be moved simultaneously and with equal movement thru a partial rotation of the shaft.

The actuating force or power is applied to the shaft either directly by a hand crank on the shaft, if manual power is employed, or by connecting the shaft with a power driven shaft by suitable mechanical means that will operate the cylinders and pistons relatively to each other with an oscillatory movement, at required moments or intervals.

The motor at one end is connected with the motor at the opposite end, in the present construction, by a fluid tight conduit, which frequently must be flexible, extending into the space in each cylinder of the motor at the other station, and the cylinder spaces thus connected thru the conduit and thru the pistons, which are hollow for that purpose, are filled with the fluid.

By reason of the reversed arrangement of the motor at one end with respect to that at the other end of the confined column of fluid, it will be seen that in one of the cylinders of the motor to which the power is applied, the fluid confined between its closed end and its piston will be forced out and will correspondingly move the cylinder in the opposite motor with which it is connected, by virtue of the pressure transmitted thru the column of fluid confined in the conduit between the cylinders. The remaining cylinders in the two motors, being reversely arranged with relation to the first mentioned cylinders, and the two cylinders in each motor being secured together, the remaining cylinders act to transmit the motion in the opposite direction when the power operated motor is reversed. By virtue of this arrangement, it will be seen that the fluid actuates the part to be moved, or applies the force or power thereto, according to the direction in which the power actuated shaft may be moved; and one side or the other of the column or body of fluid becomes, so to speak, the pressure side, according as the power operated shaft is turned forwardly or backwardly. The fluid in the other side at such time, performs no active work, but merely is expelled or transferred from the cylinder at one end to the connected cylinder at the opposite end.

In a motor of this type, it is obviously necessary to keep the cylinder spaces and conducting passages between the power operated motor and the motor at the opposite end, free from air and properly filled with the transmitting fluid, for if the body of fluid on the pressure side or in front of the piston in the power actuated cylinder becomes reduced by leakage, owing to defective construction or thru wear in parts, the disturbance or change of condtions in the body of the transmitting fluid will affect the equality or equilibrium between the actuated and the actuating side of the apparatus, and instead of imparting a positive movement to the mechanism or one of corresponding length or duration to the power actuated motor, there will be more or less lost motion, increasing often to such an extent as to render the device, in time, practically inoperative. It is necessary therefore, to maintain the operating parts of the device filled with fluid, and it is also necessary that the connecting conduit be of substantially constant internal volume under varying working pressures, so that corresponding movement of the cylinders at the two distant devices, will maintain. In accordance with the present invention, means are provided for maintaining the working parts of the device filled with liquid at all times, and a flexible conduit of constant internal volume under varying pressures has been produced so that under all conditions of operation, the desired results are produced.

The cylinders and pistons are contained within a fluid tight case, which is charged with fluid and the cylinders are provided with apertures which establish communication between the interior of the cylinder in front of its piston and the liquid holding space in the casing at proper times to establish equilibrium in the system without interfering with its operation. The apertures in the cylinders are uncovered by the piston when the cylinder reaches the end of its stroke and this occurs substantially simultaneously in one cylinder in each motor, the other cylinders serving to lock the motors together at that time. In one position of the cylinders, one side of the apparatus is equalized and in the other position of the cylinders, the other side of the apparatus is equalized, one side always being maintained as a closed system so that there may not be any relative movement between the two motors.

My system embodies two motors and connecting conduits. One motor 12, which I shall term the actuating motor, is provided with a lever 13 or other suitable means for accomplishing its operation. The distant motor 14, which I shall term the actuated motor, is connected to the device to be actuated by suitable means such as the lever 15. The two motors are connected together by the fluid tight conduits 16 and 17, one conduit serving to establish communication between the one set of cylinders in the two motors, and the other conduit serving to establish communication btween the other set of cylinders in the two motors. When the handle 13 is moved in one direction, fluid passes in one direction under pressure through one of the conduits from the motor 12 to the motor 14, and passes in the other direction, under substantially no pressure, from the motor 14 to the motor 12. When the handle 13 is moved in the opposite direction, the direction of movement of the fluid in the conduits is reversed.

The actuating motor is usually provided with a reservoir tank 8 for supplying oil to the system for compensating for oil lost by leakage or otherwise and the actuated motor 14 is provided on its upper side with any suitable type of air relief valve 7, such as is shown in Figure 5, to release any entrapped air from the system.

In many installations, the actuating motor may be identical with the actuated motor and I shall describe one of these motors. The motor comprises a metallic, fluid tight casing 21 having integral bottom, top and end walls. The side walls may be made separately and securely and tightly attached to the casing or the side walls may be made integral and provided with apertures which are closed by the cover plates 22. Formed integrally with the base 23 of the casing are reversely arranged curved pistons 24, and 25, which are spaced apart longitudinally of the casing as shown in Figure 1. The pistons 24 and 25 are hollow and are provided with conduits 26 and 27 to which the conduits 16 and 17 are connected. Each piston is provided on its end with a piston head, including a cup leather 28, which forms a tight joint with the inner surface of the associated cylinder. The cup leather is disposed between washers, to prevent its collapse and is secured to the end of the piston by the hollow cap screw 29. Journalled in the casing, is the shaft 31 to which the curved, reversely arranged cylinders 32 and 33 are secured. The cylinders are arranged so that when one cylinder is at the end of its throw in one direction, the other cylinder is at the end of its throw in the opposite direction. Each cylinder is provided with a split hub 34 through which the shaft 31 extends and the hub is provided with a tightening screw 35 for tightening the hub on the shaft. The hubs are also keyed to the shaft to prevent relative movement of the hub and shaft during the operation of the device and the key is so arranged that it presents its greatest dimension to the line of shear. The shaft 31 is provided with a V-shaped keyway, the sides of the V preferably lying at right angles to each other, and the hubs are provided with similar V-shaped keyways which register with the keyway in the shaft. The key 36 is inserted in the keyway and the greatest dimension of the key lies in the plane of separation of the cylinders and the shaft. The purpose of this construction is ease of assembly of the cylinders and the shaft. Due to this arrangement, a driving fit of the key is not required, the key is inserted loosely and then the clamping screws 35 are tightened to lock the parts together tightly. In the event that the key or the keyway wears or hammers loose as the result of unusual strain, the resulting play or backlash may be taken out by merely tightening the clamp screws 35. This obviates the necessity of tearing down the device, recutting the keyways, and fitting an oversize key.

To establish equilibrium between the two sides of the system, each cylinder is provided, adjacent its open end, with a saw-cut 37 which establishes a communication between the closed end of the cylinder and the interior of the casing 21 which is filled with fluid. When the non-operating cylinder reaches the end of its stroke, the saw-cut 37 passes beyond the cup leathers 28, establishing communication between the closed portion of the cylinder and the casing, permitting the fluid to flow through the saw-cut to establish equilibrium. The cup leathers 28 frequently grow or expand in service to such an extent that the saw-cut 37 is not uncovered. To remedy this defect, I have provided plugged openings 39 in the top of the case, directly over the positions occupied by the saw-cuts when the cylinders are at the ends of their respective throws, and by removing the plugs from the openings, it is possible to insert a knife through the saw-cut and remove the projecting edge of the cup leather.

Means are also provided for limiting the stroke of the piston to variable predetermined distances. Due to the varying length of the leathers, the growth of the leathers, the compressibility of the fluid and the expansion of the connecting conduits, and the desirability of being able to use standard devices for special work, it is desirable to provide adjustable means for limiting the stroke of the cylinder. Each cylinder is provided on its upper surface with a projection 41 and an adjustable stop is provided against which this projection abuts, to halt the movement of the cylinder. Arranged in the upper portion of the casing, in line with the two projections 41 on the respective cylinders, are adjustable stops 42, which preferably consist of screws bearing in the case. These screws extend to the exterior of the case, so that the adjustment of the throw of the cylinders may be made without opening the case. The two cylinders are secured to the shaft 31 so that the adjustable stop which is engaged by the projection on the cylinder 33 limits the movement of the cylinder 32 in its movement away from the piston. Referring to Figures 2 and 3 it will be seen that the projection on cylinder 33 by engaging the stop, stops the cylinder 32, just after the slot 37 therein is uncovered. The cup leathers 28, grow, swell and wear in use and by the use of the adjustable stops, the extent of movement of the cylinders is controllable so that the slots 37 are just uncovered, thereby preventing play and backlash and insuring the desired movement of the cylinders.

The operating shaft 31, to which the actuating or the actuated lever is secured, is journalled in the case, and means are provided for preventing leakage of the fluid from the case at the point of exit of the shaft. The case is provided with an annular recess 43, surrounding the shaft, and clamped to the case and disposed in this recess is a hat leather 44 which is held in tight engagement with the shaft by the spring 45. This effectively prevents leakage at this point. Means are also provided for taking all of the end thrust on the shaft so that the shaft is not moved longitudinally, a condition which would interfere with the alinement of the cylinders and pistons. The shaft is provided adjacent one end with an annular groove 46, in which there is seated a split washer 47 which is clamped between the case and a plate 48 secured to the case. The split washer 47 is thus held fixed in position, with respect to the case, and seating in the groove 46 in the shaft, holds the shaft in fixed position against longitudinal displacement.

In some instances, it is desirable to employ a straight line device, such as is shown in Figure 5, at the actuated end of the system. This device may also be advantageously used when it is desired to obtain a differential movement at the actuated end, that is, a movement greater or less than the movement at the actuating end. The motor shown in Figure 5 comprises a straight cylinder 51 having inlet ports 52 and 53 to which the conduits 16 and 17 are connected, arranged at its upper surface. Disposed in the cylinder is a shaft or piston rod 54 to which the pistons 55 and 56, comprising cup leathers, are secured. The cup leathers are suitably held in place on the shaft, as by the nut 57, and are held in the proper space relation by the spacing block 58. One end of the shaft 54 extends from the cylinder, the joint being sealed by a hat leather 59. The piston rod 54 is preferably hollow and is connected to the rod 60 of the mechanism to be actuated by the bolt 50 extending through the piston rod. By unscrewing the bolt, the device may readily be separated from the mechanism to be actuated. The other end of the shaft extends from the cylinder through a joint which is sealed by the hat leather 61 and such projecting end is covered by the cap 62. Various means may be employed for limiting or adjusting the stroke of the shaft 54. These limiting means may be placed on the shaft 54 at a part thereof which is external to the cylinder or may be associated with the mechanism to be operated, or may be disposed within the motor. In Figure 5 I have shown a perforated skirt 63 secured to the shaft 54, which contacts with the washer 64 to limit the movement of the shaft in that direction. A screw 65 in the end of the cap 62 limits the movement of the shaft in the other direction. In Figure 6, I have shown the shaft extending through the end of the cap 62 and provided with adjustable nuts 67, 68 for limiting the movement of the shaft. The motor is also provided with means for equalizing the fluid supply in the ends of the cylinder and for eliminating air from the cylinder. Formed on the upper side of the cylinder 51, adjacent its center, is a fluid chamber 71 from which ports 72 and 73 extend into the cylinder. The port 73 is uncovered by the piston 56 when such piston reaches the end of its stroke in one direction, and the port 72 is uncovered by the piston 55 when this piston reaches the end of its stroke, in the opposite direction, thus permitting liquid to flow through the ports at different times, during the operation of the device, to equalize the pressures. The chamber 71 contains a charge of fluid to replace any fluid lost from the system by leakage or otherwise. Any air contained in the system will find its way into the cylinder 51 and will pass from the cylinder through the portholes 72, and 73 into the chamber 71 and thus eliminate itself from the system. Instead of permitting the chamber 71 to remain open to permit this air to escape, I prefer to close the chamber and provide it with an air valve for controlling the escape of the air. The chamber is preferably closed by a plug 74 having a vent 75 therein, which is controlled by the valve 76, carried by the float 77. The float 77 is provided with passages 78 extending vertically therethrough, to permit the passage of air past the float. When air accumulates in the chamber 71, forcing the level of the liquid therein downwardly, the float descends and opens the vent 75 and permits the air to discharge. By virtue of this arrangement, dirt and other foreign matter is prevented from contaminating the fluid contained in the chamber 71, a condition which would be deleterious to the apparatus.

The use of the chamber 71 also permits positive equalization of the oil in the system on opposite sides of the piston. Assuming an excess of liquid is introduced into the chamber to the right of the piston due to an excess of liquid in the discharging cylinder of the companion motor, the excess liquid passes through the vent 73 into the chamber and thence through the vent 72 (assuming that the valve 76 is closed) past the spacer 58, which is of less diameter than the cylinder and past the cup leather 55 into the cylinder to the left of the piston and thence through the conduit 17 to the companion motor.

When the device shown in Figure 5 is installed with the cylinder in a vertical position, the air release chamber may be omitted. When made for such use, the port 52 or 53 which is disposed at the upper end of the cylinder opens into the cylinder at its extreme upper end, so that no air pocket may form above the port. Any air in the cylinder will find its way through the port and through the conduit to the companion motor, which, in such instance must be disposed at a higher level, and is released through the filling reservoir of the higher motor. When the cylinder is vertically disposed, one of the cup leathers 55 or 56 is inverted, and in order to prevent air from collecting in the inverted cup leather, the cup formed by the cup leather is filled with a suitable filler.

It frequently happens in various installations of the system that one motor is movable with respect to the other motor, so that the connecting conduit must be flexible. It is essential to the perfect operation of the system, that the conduit be substantially of invariable internal volume under varying pressures. This condition presents no difficulty when a metal tube may be used for transmitting fluid between the two motors, but when a flexible conduit must be employed, the expansion of the conduit under pressure, interferes with the operation of the system. To overcome these difficulties, I have provided a flexible conduit which maintains a constant internal volume under variations in working pressure and have provided means and a method of producing this conduit. In accordance with my invention, I take a flexible conduit, such as a hose, and introduce liquid under pressure into the hose to expand it. I prefer to use a pressure in excess of the maximum working pressure to which the conduit will be subsequently subjected in use. With the flexible conduit in the expanded position, I draw into the conduit a flexible metallic lining which fits tightly into the expanded conduit. When the pressure on the interior of the conduit is released, the conduit contracts and exerts a pressure on the metallic lining which is substantially equal to the maximum working pressure to which the conduit may be subjected. This places the lining under a compression which is not overcome until the maximum working pressure is obtained in the conduit. The metallic lining does not change its internal volume under compression, and consequently the internal volume of the conduit remains constant under varying working pressure. In accordance with my invention, I clamp one end of the hose 81 in a block and close the other end of the hose and then introduce fluid under pressure into the hose to expand it. The end of the hose is placed between the internal cylindrical wedge 82 which extends into the end of the hose and the external clamping block 83, into which the end of the hose extends. The block 83 is provided on its outer surface with a thread which is engaged by the nut 84 which, when turned, draws the block 83 inwardly and pulls the end of the hose with it, so that the end of the hose is expanded and is firmly clamped between the hollow wedge member 82 and the block 83. The nut 84 is provided on its end with a shoulder 85, which engages a shoulder 86 on the nipple 87, onto which the block 83 is drawn by the nut. Screwed into the nipple 87 at the end opposite the hose 81, is a pipe 88 through which liquid is introduced to inflate the hose. At its opposite end, the hose 81 is closed by the gland 89, through which extends a fine wire 91. The wire extends through the hose 81 and the nut 84 and into the pipe 88, and adjacent the far end of the pipe 88, the wire is connected to a block 92. Disposed in the pipe 88, which is of sufficient diameter to contain it, is a flexible metallic conduit 93 which surrounds the wire 91 and lies between the head 92 and the nut 84. The wire 91 extends through the gland 89 and by pulling on the wire at that end, the flexible conduit 93 is forced into the hose 81. The hose is first expanded by the introduction of fluid under the desired pressure and then the wire 91 is pulled to force the flexible conduit 93 into the expanded hose. The diameter of the conduit 93 is such that, with the hose expanded, it fits snugly into the hose. As soon as the flexible conduit 93 has been properly seated in the hose 81, the pressure within the hose is released and the hose contracts, exerting a pressure on the conduit 93 which now forms the lining of the hose. The body of the hose remains in tension, and this tension is sufficient to withstand the normal working pressure produced within the hose, so that, in operation, the internal volume of the hose is not varied due to variations in pressure of the fluid therein. I have found in practice that when drawing the hose over the wedge 82 that an annular bead 94 is formed in the inside of the hose at the end of the wedge, and it is necessary to insert an instrument and remove this bead before the metallic lining is drawn into the boss.

I preferably employ liquid under pressure for expanding the hose and when the hose is being filled with liquid, air may be entrapped therein, which is undesirable. To provide for the release of this air, I provide an air valve 95 on the fitting at one end of the hose, preferably on the gland 89, and by raising the gland the entrapped air will collect at the valve inlet, so that by opening the valve 95, the air may be discharged.

I claim:

1. In a motion transmitting device, an actuating motor having reversely arranged cylinders and pistons therein movable relatively to the cylinders, and adapted to transmit their motion through a non-compressible fluid according to the direction in which the motive force is caused to actuate the said cylinders and pistons, and adjustable means arranged to be engaged by the cylinders for controlling the extent of relative movement of the pistons and cylinders.

2. In a motion transmitting device, an actuating motor having reversely arranged cylinders and pistons therein movable relatively to the cylinders, and adapted to transmit their motion through a non-compressible fluid according to the direction in which the motive force is caused to actuate the said cylinders and pistons, and adjustable means arranged to be engaged by the cylinders for controlling the extent of relative movement of the pistons and cylinders in both directions.

3. In a motion transmitting device, an actuating motor having reversely arranged cylinders and pistons therein movable relatively to the cylinders, and adapted to transmit their motion through a non-compressible fluid according to the direction in which the motive force is caused to actuate the said cylinders and pistons, a fluid tight casing in which said cylinders and pistons are disposed and adjustable means operable on the cylinders and adjustable from the exterior of the casing for controlling the extent of relative movement of the pistons and cylinders.

4. In a motion transmitting device, an actuating motor having reversely arranged cylinders and pistons therein movable relatively to the cylinders, and adapted to transmit their motion through a non-compressible fluid according to the direction in which the motive force is caused to actuate the said cylinders and pistons, a fluid tight casing in which said cylinders and pistons are disposed and oppositely disposed screws extending into the casing and arranged to limit the movement of the cylinders with respect to the pistons in both directions of movement.

5. In a motion transmitting device, a liquid tight casing, reversely arranged pistons in said casing, reversely arranged cylinders associated with said pistons, a shaft to which said cylinders are secured, said shaft being provided with a circumferential groove and a split ring seated in said groove and secured to the casing.

6. In a motion transmitting device, a liquid tight casing, reversely arranged pistons in said casing, reversely arranged cylinders associated with said pistons, a shaft to which said cylinders are secured, said shaft being provided with a V-shaped groove, said cylinders being provided with a V-shaped groove registering with the first groove and a key seated in said grooves.

7. In a motion transmitting device, a pair of reversely arranged cylinders, a shaft on which said cylinders are mounted and a quadrilateral key having its greatest dimension in the plane of separation of the cylinders and shaft.

8. In a motion transmitting device, a rotatable shaft, a pair of reversely arranged cylinders, split hubs on said cylinders through which the shaft passes, means for tightening said hubs to said shaft and a key having its greatest dimension in the plane of separation of the hubs and shaft.

9. In a motion transmitting device, a rotatable shaft, a pair of reversely arranged cylinders, split hubs on said cylinders through which the shaft passes, bolts for tightening said hubs to said shaft, a V-shaped groove in the hubs opposite the split therein, a V-shaped groove in the shaft registering with the first groove and a key seated in said grooves.

10. In a motion transmitting device, an actuating motor having reversely arranged cylinders and pistons therein movable relatively to the cylinders, and adapted to transmit their motion through a non-compressible fluid according to the direction in which the motive force is caused to actuate the said cylinders and pistons, a fluid tight casing in which the cylinders and pistons are disposed, said cylinders being provided adjacent their open ends with narrow slots establishing communication between the interiors of the cylinders and the fluid holding space in the casing, and normally plugged holes in the top of the casing through which said slots may be inspected.

11. In a device operating to transmit motion through the medium of a non-compressible fluid and having a motor piston and cylinder to which power is applied, a complementary piston and cylinder associated therewith, and a flexible conduit of constant volume under the fluid pressures to which it is subjected connecting said pistons and cylinders.

12. In a motion transmitting device adapted to operate through the medium of a body of non-compressible fluid, the combination of a motor piston and cylinder movable relatively to each other, a similar cylinder and piston reversely arranged with respect to the first named cylinder and piston and actuated thereby, a flexible conduit of constant volume under the fluid pressure to which it is subjected connecting the cylinder space in front of the piston in one motor with the corresponding space in the other motor, a fluid tight case enclosing each piston-cylinder unit, and means for establishing communication betwen the interior of the case and the cylinders in front of the pistons at predetermined periods in the operation of the motor.

13. In a motion transmitting device, an actuating motor having reversely arranged pistons, reversely arranged cyclinders engaging said pistons, movement of the cylinders serving to transmit motion through the medium of a non-compressible fluid, a fluid tight casing in which said cylinders and pistons are disposed, said cylinders being provided adjacent their open ends with slots for establishing communication between the interiors of the cylinders and the fluid holding space in the case, and adjustable means adapted to be engaged by one cylinder to limit the movement of the other cylinder.

14. In a motion transmitting device, a cylinder, pistons arranged in said cylinder, means for limiting the movement of the pistons, a liquid supply chamber arranged on the upper side of the cylinder and communicating with the cylinder and an air valve in said chamber.

15. In a motion transmitting device, a cylinder, pistons arranged in said cylinder, a shaft on which said pistons are secured, a liquid supply chamber arranged on the upper side of the cylinder and arranged to permit the discharge of air therefrom and spaced ports connecting the chamber with the cylinder, the ports being arranged to be uncovered respectively by the pistons at the respective ends of their strokes.

16. In a motion transmitting device, a cylinder adapted to hold a non-compressible fluid, conduits connected to the cylinder adjacent the opposite ends thereof, pistons disposed in said cylinder, a shaft to which said pistons are secured, a fluid supply chamber arranged on the upper side of the cylinder and communicating with the cylinder, an air vent in said chamber and a float valve in the chamber controlling said vent.

17. The combination with a motion transmitting device operating to transmit motion through the medium of a non-compressible fluid, of a flexible conduit for the fluid comprising an outer member under tension and an inner member under compression due to the tension in the outer member.

18. The combination with a motion transmitting device operating to transmit motion through the medium of a non-compressible fluid, of a flexible conduit for the fluid comprising an outer flexible conduit expanded under a pressure equal to the maximum pressure encountered in the conduit and a flexible lining in the conduit subjected to compression by the outer conduit.

19. The combination with means for placing a non-compressible fluid under pressure of a flexible conduit for the fluid comprising a flexible outer expanded conduit and a flexible metallic lining fitting tightly in said outer conduit.

20. The method of making a flexible conduit which has a constant interior volume under variable working pressures which comprises introducing pressure into a flexible conduit to increase its diameter and inserting a flexible metallic lining into the expanded conduit.

21. The method of making a flexible conduit which has a constant interior volume under variable working pressures which comprises expanding a flexible conduit under a pressure not less than the maximum working pressure, inserting into the expanded conduit, a flexible metallic lining which snugly fits the expanded conduit and releasing the expanding force, whereby the conduit places the lining under compression.

22. In a motion transmitting device, an actuating motor having reversely arranged cylinders and pistons therein movable relatively to the cylinders, and adapted to transmit their motion through a non-compressible fluid according to the direction in which the motive force is caused to actuate the said cylinders and pistons, a fluid tight casing in which said cylinders and pistons are disposed and oppositely disposed means, each engaging with one cylinder at one end of its stroke thereby allowing the two cylinder unit to rotate far enough to open communication between the body of fluid confined in the opposite cylinder and that in the case and to adjustably control the extent of movement of the two cylinder unit.

23. In a motion transmitting device, an actuating motor having reversely arranged cylinders and pistons therein movable relatively to the cylinders, and adapted to transmit their motion through a non-compressible fluid according to the direction in which the motive force is caused to actuate the said cylinders and pistons, a fluid tight casing in which said cylinders and pistons are disposed and oppositely disposed screws extending into the casing and arranged to limit the relative movement of the pistons and cylinders in both directions, and means for locking these screws in position and for preventing leakage from the case along these screws.

24. In a motion transmitting device, an actuating motor comprising a cylinder having a transverse slot therein, a leather piston disposed in said cylinder, means for relatively moving said piston and cylinder to cause the piston to uncover the slot in the cylinder and means for adjusting the limits of said movement to compensate for variations in dimension of said piston, whereby the movement is sufficient only to cause the piston to uncover the slot.

25. In a motion transmitting device, an actuating motor comprising a cylinder closed at one end and open at the other and provided adjacent its open end with a transverse slot, a piston in said cylinder, means for relatively moving the piston and cylinder to cause the slot to open into the closed end of the cylinder, an adjustable stop and an abutment on the cylinder adjacent its closed end adapted to engage said stop.

26. In a motion transmitting device, an actuating motor having reversely arranged cylinders and pistons therein movably relatively to the cylinders, and adapted to transmit their motion through a non-compressible fluid according to the direction in which the motive force is caused to actuate the said cylinders and pistons, a fluid tight casing in which said cylinders and pistons are disposed and oppositely disposed means adjustable from the outside of the case to limit the relative movement of the cylinders and pistons and each abutting against its cylinder in such a manner as to maintain the thrust on the cylinder in the same direction as the thrust caused by the non-compressible fluid.

27. In a motion transmitting device, an actuating motor having reversely arranged cylinders and pistons therein movable relatively to the cylinders, and adapted to transmit their motion through a non-compressible fluid according to the direction in which the motive force is caused to actuate said cylinders and pistons, an actuated motor having reversely arranged cylinders and pistons therein, conduits connecting the cylinders in the actuating motor with the cylinders in the actuated motor, a casing enclosing the cylinders of the actuated motor and an air vent arranged on said casing to permit the discharge of air which accumulates in the casing.

28. In a motion transmitting device, a cylinder adapted to hold a non-compressible fluid, a piston dividing the cylinder into two chambers, a piston rod extending entirely through said cylinder, conduits connected to the chambers at the remote ends thereof, adjustable means for limiting the stroke of the piston and ports in the cylinder arranged to permit the passage of fluid from the receiving chamber to the discharging chamber when the piston reaches the end of its stroke.

29. In a motion transmitting device, a cylinder adapted to hold a non-compressible fluid, a piston dividing the cylinder into two chambers, a piston rod, heads on said cylinder through which the piston rod extends, leathers sealing the joints between the heads and the piston rod, means for limiting the stroke of the piston, conduits connected to the chambers at the remote ends thereof through which fluid passes into and discharges from the chambers and means arranged to permit the passage of fluid from the receiving chamber to the discharging chamber when the piston reaches the end of its stroke at either end of the cylinder.

In testimony whereof, I have hereunto set my hand.

HORACE L. HIRSCHLER.